Jan. 27, 1970 — R. S. THURSTON — 3,492,533
GROUND FAULT DETECTION FOR POWER DISTRIBUTION SYSTEM
Filed Jan. 10, 1967

INVENTOR.
ROBERT S. THURSTON
BY Kenway, Jenney & Hildreth
ATTORNEYS

United States Patent Office 3,492,533
Patented Jan. 27, 1970

3,492,533
GROUND FAULT DETECTION FOR POWER
DISTRIBUTION SYSTEM
Robert S. Thurston, Needham, Mass., assignor, by mesne
assignments, to The Kelek Company, Norwood, Mass.,
a corporation of Connecticut
Filed Jan. 10, 1967, Ser. No. 608,429
Int. Cl. H02h 3/34, 1/02
U.S. Cl. 317—18                           9 Claims

ABSTRACT OF THE DISCLOSURE

A ground fault detector for a three-phase, four wire distribution unit is adapted to open a switch upon the occurrence of an inequality in the voltages between the phase lines and the conductive shield for the feeder lines. The latter is connected with the neutral wire from the power source through an impedance that completes a circuit path for fault current and also limits such current.

---

Figure 1:
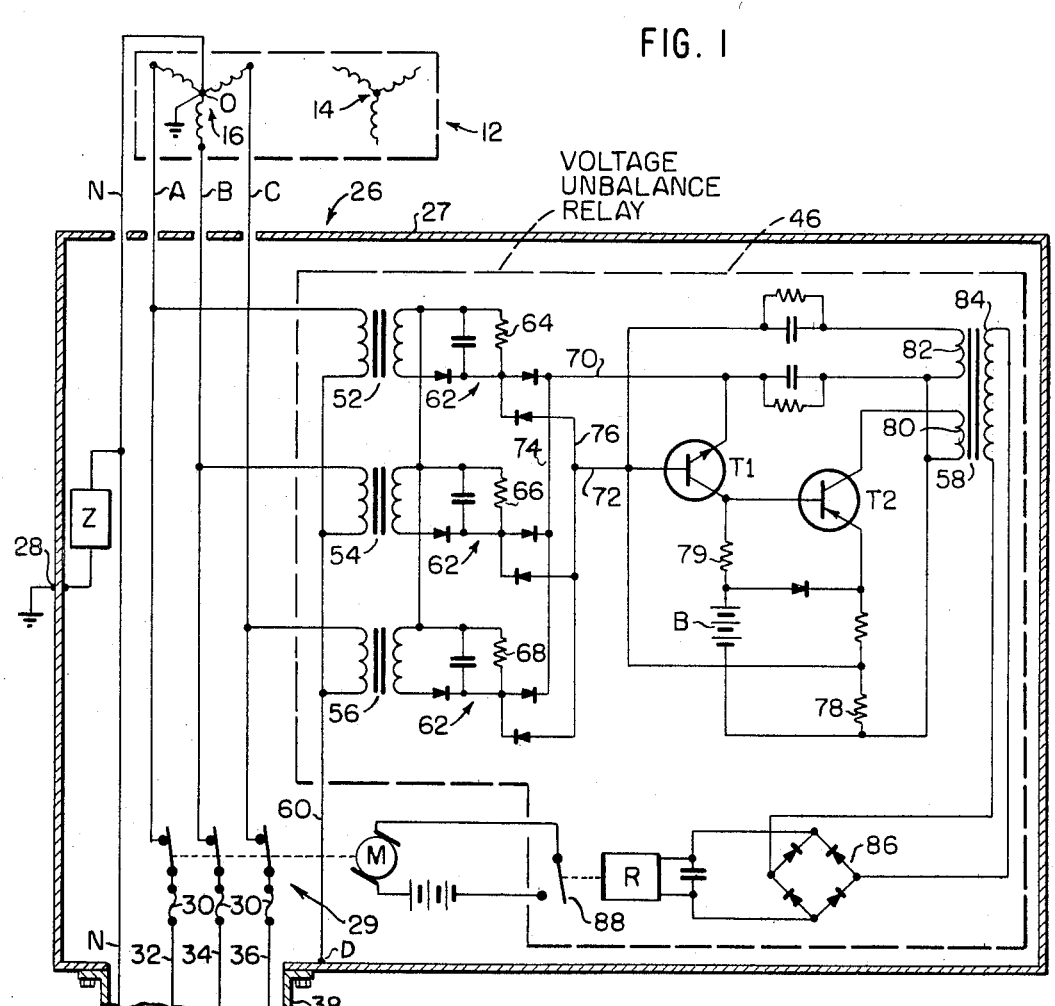

The present invention relates generally to means for detecting the presence of a shorting or arcing fault between a conductor in a multi-phase feeder line and its grounded metal conduit or enclosure. More particularly, it relates to means for detecting such a fault by the presence of an inequality in the voltages between the phase lines and the metal enclosure of the switchboard or distribution equipment, such means being useful, for example, to trip a circuit breaker or to open a switch by actuation of a switch motor or pneumatic switch operator.

In a typical three-phase, four wire power distribution system there are a grounded neutral line and a plurality of phase lines at equal voltages above the neutral line. These lines extend from a power source which may take the form of a distribution transformer, a transformer bank or a power company network, connected with the power generating equipment. The phase and neutral lines are connected to a switchboard which includes one or more switches or circuit breakers mounted within a grounded metal enclosure. A load circuit is connected to the switchboard by a feeder cable comprising conductors in metal conduit or metal enclosed bus duct, such metal parts being connected with the switchboard enclosure. In larger systems there may be a main switch or circuit breaker having a main bus on its load side connected with a plurality of feeder switches or circuit breakers for a plurality of corresponding feeder cables. The feeder cables may be of various lengths extending up to several hundreds of feet from the switchboard enclosure.

Commonly, the neutral conductor of the power transmission line, which is grounded at the power source, is connected by a ground strap to the grounded enclosure of the switchboard. If an arcing fault occurs between one of the feeder lines and its metal shield or conduit, there are parallel paths for the return current. One is along the conduit to a ground connection and thence through ground to the neutral connection at the power source. Another path is along the conduit to the enclosure of the switchboard, and thence through the ground strap and the neutral line back to the neutral connection of the power source. The latter path actually carries nearly all of the fault current, and this is explained by the fact that this path has a lower impedance than a more remote path through ground.

With the foregoing connections, reliance is conventionally placed upon protective devices such as fuses or circuit breakers in the feeder lines. Thus an arcing fault of sufficient magnitude may increase the current in one phase and trip its circuit breaker or blow its fuse. However, it has been found that many faults do not produce sufficient current to operate such safety devices. This results in some cases from the fact that the fault occurs at a substantial distance along the feeder cable from the switchboard, and the impedance of the feeder line limits the fault current to a valve insufficient to trip the breaker or blow the fuse. Another disadvantage is that even though a fault current might be of sufficient magnitude eventually to blow the fuse or trip the breaker, the delay in time before this occurs might allow severe damage to occur to electrical equipment of the building structure or contents.

For example, fault currents ranging from 8,500 to 11,-000 amperes returning through normally installed conduit have produced showers of sparks at points along the fault return circuit such as joints where the conduit is connected in such manner to introduce resistance, for example where there is corrosion, or loose lock nuts or other threads not tightened. These showers of sparks can readily ignite combustible material. An arcing fault of 2,000 amperes at 480 volts can burn holes in a steel switch enclosure in two to four seconds, and can completely destroy it in ten seconds. Tests show that a two-inch steel conduit will burn through in about three seconds with a current of 500 amperes, and in five seconds with a current of 350 amperes. Aluminum conduit will burn through in less time.

Prior efforts to overcome these disadvantages have dealt with means for reducing the impedance of the previously described fault current return circuit including limiting the lengths of feeder circuits to permit sufficient current flow to operate the normal short circuit protective devices quickly. This method often allows very large fault currents to flow until the protective devices are operated, with the attendant hazard of sparks and damage.

More recently, there have been proposals for detecting ground faults by the presence of current in the ground strap, as illustrated by the patent to Soares No. 3,005,932. In a three-phase distribution system with equally loaded phases there would normally be no current flowing in the neutral line. According to said patent, an arcing fault in one phase line would produce a current in the ground strap which through inductive coupling could be used to operate a safety device. However, any such arrangement based on fault current sensing is subject to the same criticism previously mentioned, namely, that the fault currents may be very substantial because of the low impedance of the return circuit, and there may be a momentary shower of sparks or severe burning at the point of arcing or elsewhere along the feeder cable.

The objects of this invention include providing means for detecting the presence of an arcing fault without excessively high ground fault current, thereby lessening the hazards of sparks and damage to equipment.

Having in view the foregoing and other objects hereinafter more clearly appearing, the features of this invention reside in an arrangement whereby the metal enclosure of the switchboard is allowed to shift momentarily in potential with respect to ground as the result of an arcing fault in a feeder line, and this momentary shift produces an inequality in the voltages between each of the feeder lines and the enclosure, this inequality being detected and utilized as a signal for operation of indicating, signalling or protective equipment. A related feature is the employment of an impedance through which the grounded neutral line from the power source is connected to the enclosure of the switchboard.

Other features include the adaptation of this novel method to permit its use in conjunction with other features herein described.

Figure 2:
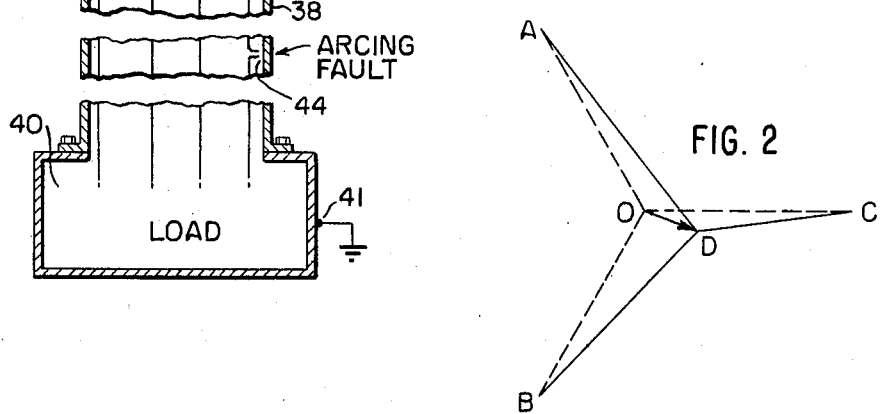

Still other features of the invention reside in certain details of construction and in arrangements of the elements and modes of operation which will become evident from the following description of a preferred embodiment, having reference to the appended drawings in which FIG. 1 is a schematic circuit diagram illustrating a preferred embodiment of the invention; and FIG. 2 is a vector diagram illustrating the operation of the circuit.

Referring to the drawings, at 12 there is shown a typical power distribution transformer for a three-phase, four-wire system, having Y-connected primary windings 14 and Y-connected secondary windings 16 with a grounded neutral at a point 0. The primary windings may be delta-connected, if desired. The secondary windings are connected with phase lines A, B and C, and a neutral line N is terminated at the neutral secondary connection O.

The transformer 12 is connected with a switchboard 26 having an enclosure 27 grounded at 28, the lines N, A, B and C taking the form of cables or bus duct. Within the switchboard there is a main switch 29 having a motor M and fuses 30. It will be apparent from the following discussion that a circuit breaker may be employed in place of the switch 29. The load side of the switch is connected to a feeder cable comprising the line N and feeder lines 32, 34 and 36, these lines passing through metal conduit 38 to a load 40 grounded at 41. The load may be, for example, a panel board, a motor control center or any other type of load.

From the following discussion, it will become apparent that although only one feeder cable is shown, there may be more than one feeder cable, in which case the load side of the switch 29 would be connected with a main bus which would be connected in turn to each feeder cable through a separate feeder breaker or switch.

The foregoing connections are the same as those conventionally used in any three-phase, four-wire power distribution system. We next turn to one of the points of difference, namely, the connection of the neutral line N. As stated above, in a conventional system the wire N is connected by a ground strap directly to the enclosure 27. According to the present invention the line N is connected to the enclosure through an impedance Z. This impedance may be resistive, inductive or capacitive, or a combination of these impedances. A function of the impedance, as herein further described, is to limit any fault currents that may flow through it.

An understanding of the further functions of the impedance Z may be gained from considering the effect of a typical arcing fault. A common fault is shown at 44 and comprises an arc from the feeder line 36 to the conduit 38 which is at ground potential by reason of ground connections at points such 28 and 41. It will be apparent that the same kind of fault may occur with metal enclosed bus ducts in place of conductor cables within metal conduit. The distance from the swithboard at which such a fault is assumed to occur may vary anywhere from a few feet to several hundreds of feet in various applications.

As previously stated, there are parallel paths by which a return circuit may be completed between the feeder line 36 at the fault 44 and the ground connection 0 at the transformer. One path is through ground from connections at 41 or 28 to the ground connection at 0, but any such path would cause the return current to flow at some distance from the feeder line 36 and its corresponding phase line C. Another path is through the conduit 38 to the enclosure 27, then through the impedance Z and the neutral line N to the connection 0 at the transformer, whereby the return current flows along paths that are close to the conductors 36 and C. For the reason previously stated, substantially all the fault current returns to the transformer along the last-mentioned path.

FIG. 2 is a vector voltage diagram illustrating the result of a fault current flowing in the feeder line 36. Broken lines OA, OB and OC represent the voltage vectors from the neutral connection 0 to each of the phase lines A, B and C, respectively. A voltage vector OD represents the momentary difference in potential between the enclosure 27 at a point such as D and the connection 0 due to the fault current which is flowing through the impedance Z. The vectors DA, DB and DC represent the differences in potential between the enclosure 27 and each of the feeder lines 32, 34 and 36.

According to this invention, use is made of the resultant difference or unbalance in the magnitudes of the voltages DA, DB and DC, produced by the ground fault, to signal the presence of such fault and to operate protective means, illustrated in the drawing by the main switch motor M. This unbalance is detected by a voltage unbalance relay 46, outlined in the drawing by a broken line. Relays of this type or their functional equivalents are standard pieces of equipment now in use in other applications and the particular form of the relay forms no part of the present invention. However, for completeness of description a particular form of voltage unbalance relay is shown in the drawing and described below. Further description of its circuit may be found in Patent No. 3,155,880 dated Nov. 3, 1964 to Louis E. Salina.

The illustrated relay 46 includes transformers 52, 54 and 56 and transistors T1 and T2, together with an output transformer 58 and related circuits. The primary windings of the transformers 52, 54 and 56 are Y-connected by a wire 60 to a common connection D on the enclosure 27. The secondary windings are connected to identical single phase rectifier circuits 62, with equal resistors 64, 66 and 68 across which D.C. voltages appear with negative connections in common.

The primary windings of these transformers may be rated in some cases for a different voltage than that represented by one of the vectors OA, OB or OC, in which case they are connected Y—Y to the secondaries of three intermediate transformers. The wire 60 is connected to the common connection of such secondaries rather than to the enclosure 27 at the point D. The primary windings of such intermediate transformers are then Y-connected to the phase lines A, B and C, with their common connection made to the enclosure 27 at the point D.

Wires 70 and 72 connected respectively to the emitter and base of the transistor T1 are connected with resistors 64, 66 and 68 through a pair of Y-connected rectifier circuits 74 and 76.

An inspection of this circuit will show that if the voltages on the primary windings of the transformers 52, 54 and 56 are equal, the D.C. voltages on the resistors 64, 66 and 68 will also be equal and the circuit will be in balance with no current flowing through the wires 70 and 72. However, if the voltages become unequal in magnitude, a negative base-to-emitter bias voltage will appear on the transistor T1. This condition arises when there is a difference in the lengths of the vectors DA, DB and DC in FIG. 2.

The transistors T1 is normally conductive because a positive base-to-emitter bias is supplied by a battery B, which produces the bias across a resistor 78. The transistor T2 is also normally conductive because a negative base-to-emitter bias is supplied by the battery B, which produces the bias across a resistor 79 as a result of conduction in the transistor T1.

Oscillation of the circuit results from inductive coupling between a winding 80 in the collector circuit of the transistor T2 and a winding 82 connected with the base of the transistor T1 in proper phase to produce oscillation.

In the case of an unbalance in the voltages across the primary windings of the transformers 52, 54 and 56, the resulting voltage across the wires 70 and 72 is of such polarity as to reverse the base-to-emitter bias on the transistor T1, causing it to cease conduction. This interrupts the oscillation.

A secondary winding 84 on the transformer 58 is connected through a rectifying bridge circuit 86 to the operating coil of a relay R. This relay is shown in the normally energized condition with its contacts 88 open, thereby interrupting the energizing circuit of the motor M. When the oscillation of the transistor T2 is stopped the relay R is deenergized, the contacts 88 are closed and the motor M is energized to open the main switch 29.

If desired, the relay R may actuate an adjustable time delay relay to delay the operation of the motor M or other protective means.

The advantages of the above-described system largely result from the fact that it imposes an upper limit on the fault current that can flow before operation of the motor M or other protective device. The impedance Z limits the fault current to a maximum value which is not likely to cause dangerous showers of sparks at poor joints in the conduit or bus enclosure system, and damage to conduits, enclosures and conductors. This also means that an upper limit is placed on the current to be interrupted by the switch 29 or other protective device, which reduces or prevents any damage to such device, such as wear on its arcing contacts.

The above-described system is effective to operate the switch 29 or other protective device in two to three seconds after an arcing fault occurs.

The circuit is reset by closing the switch 29 after the fault has been eliminated.

It will be evident that although batteries are shown as power supplies for the motor M and the transistors, this is merely to simplify the description, and if desired they may be replaced by suitable conventional rectifying circuits energized by the lines A, B and C, or the motor M may be an alternating current motor receiving its power from the lines A, B or C.

Other variations in the construction and arrangement of the parts can also be accomplished in accordance with recognized practices, without departing from the spirit and scope of this invention.

Having thus described the invention, I claim:

1. Ground fault detection means for a three-phase, four wire distribution unit, said detection means comprising the combination of
    means to connect three feeder lines having a grounded conductive shield to one side of the distribution unit,
    means to connect three phase lines from a power source to the other side of the distribution unit,
    a current limiting impedance electrically connecting the conductive shield with a grounded neutral line from the power source, and
    a detection device having a first input connection electrically connected to the conductive shield, three input connections electrically connected to the respective phase lines, and means to produce a fault signal upon the occurrence of an inequality in the magnitudes of voltages between each of said three input connections and said first input connection.

2. The combination according to claim 1 in which the distribution unit is a switch.

3. The combination according to claim 1 in which the impedance is a current limiting resistor.

4. The combination according to claim 1 in which the distribution unit is a switch connecting the feeder lines with the phase lines, and the detection device is adapted to open the switch upon detecting the said inequality.

5. The combination according to claim 1 in which the detection device has for each phase line a transformer with a primary winding connected between the phase line and the said first input connection and a circuit for detecting an inequality in the magnitudes of the voltages on the secondary windings of the transformers.

6. The combination according to claim 4 in which the neutral line is extended with the feeder lines through the conductive shield.

7. The combination according to claim 6, in which the detection device is adapted to open the switch, after a time delay upon detecting the inequality.

8. Ground fault detection means for a three-phase, four wire distribution unit having an electrically conductive enclosure, said detection means comprising the combination of
    means to connect three feeder lines having a conductive shield to one side of the distribution unit with the shield electrically connected to the enclosure,
    means to connect three phase lines from a power source to the other side of the distribution unit,
    means to support a neutral line from the power source in electrically insulated relation to the enclosure,
    a current limiting impedance connected between the enclosure and said neutral line, and
    a detection device having a first input connection electrically connected to the enclosure, three input connections electrically connected to the respective phase lines, and means to produce a fault signal upon the occurrence of an inequality in the magnitudes of voltages between each of said three input connections and said first input connection.

9. The combination according to claim 8, in which the distribution unit is a switch connecting the feeder lines with the phase lines, and the detection device is adapted to open the switch upon detecting the said inequality.

References Cited

UNITED STATES PATENTS

| 3,072,827 | 1/1963 | Benish | 317—18 |
| 3,113,245 | 12/1963 | Hoffmann | 317—18 |

FOREIGN PATENTS 557,551  7/1926  Germany.

LEE T. HIX, Primary Examiner

J. D. TRAMMELL, Assistant Examiner

U.S. Cl. X.R.

317—27